Oct. 17, 1961 — J. M. HUNT ET AL — 3,004,351
HIGH SPEED FLIGHT SIMULATOR APPARATUS
Filed Sept. 21, 1956 — 4 Sheets-Sheet 1

JOHN M. HUNT
MERLE W. CRABB
INVENTORS

BY *Darby & Darby*
ATTORNEYS

JOHN M. HUNT
MERLE W. CRABB
INVENTORS

BY Darby & Darby
ATTORNEYS

MERLE W. CRABB
JOHN M. HUNT
INVENTORS

BY Darby & Darby
ATTORNEYS

Oct. 17, 1961    J. M. HUNT ET AL    3,004,351
HIGH SPEED FLIGHT SIMULATOR APPARATUS
Filed Sept. 21, 1956    4 Sheets-Sheet 4

JOHN M. HUNT
MERLE W. CRABB
INVENTOR

BY Darby & Darby
ATTORNEYS

United States Patent Office 3,004,351
Patented Oct. 17, 1961

3,004,351
HIGH SPEED FLIGHT SIMULATOR APPARATUS
John M. Hunt, Binghamton, and Merle W. Crabb, Vestal, N.Y., assignors to General Precision, Inc., a corporation of Delaware
Filed Sept. 21, 1956, Ser. No. 611,182
4 Claims. (Cl. 35—12)

This invention relates to grounded training apparatus and more particularly, to the simulation by means of such apparatus of high subsonic, transonic and supersonic flight. For many years it has been recognized that pressure disturbances in air propagate at the speed of sound in the air, and the speed of sound has long been known to be a function of air temperature. When the speed of an aircraft or missile becomes so great that air flow over portions of the aircraft is almost supersonic, disturbances made in the air by passage of the aircraft through the air cannot propagate ahead of the aircraft in its direction of travel since the aircraft is traveling at the speed of propagation of the disturbances. The resulting pressure wave which builds up against the leading edges of the aircraft is known as shock wave. It has been known for many years that supersonic velocity of a body in air causes numerous phenomena which are absent or undetectable during low speed subsonic flight.

The effects on drag, lift and other aerodynamic phenomena near, at and above sonic speeds has been specified for many years by a parameter known as "Mach number." Since, under any given standard weather conditions, the temperature of air varies with altitude, Mach number has long been known to be a function of altitude. Mach number is usually expressed as $$V_p \sqrt{\frac{T}{T_{sl}}}$$

where $V_p$ is airspeed, T is ambient temperature, and $T_{sl}$ is temperature at sea level. As soon as it became necessary to provide trainers for the simulation of high speed flight, the effects of Mach number were introduced into trainer aerodynamic computations by modifying aerodynamic forces and moments potentials by potentiometers operated in response to airspeed and temperature ratio. Since trainers had been built for many years to simulate flight under given temperature conditions, i.e., under so-called "standard atmosphere" conditions, and since previous temperature simulation in such trainers had been provided by potentiometers operated by the altitude computer portion of such trainers, when the effects of Mach number were considered sufficiently important to introduce into trainers, it was immediately obvious that Mach number effects could be simulated by modifying aerodynamic forces and moments potentials in accordance with airspeed-operated and altitude-operated potentiometers. Because a rather large number of aerodynamic forces and moments are computed in most trainers, Mach number servos were constructed at an early date to provide a mechanical shaft to position the large number of potentiometers needed to modify the many aerodynamic forces and moments potentials in accordance with Mach number. Thus, since about 1949 in the Link C-11 jet trainer, servos repsonsive to simulated airspeed and a function of simulated altitude have been provided to modify simulated aerodynamic forces and moments potentials to provide the effects of Mach number in flight simulation. Such servos commonly comprise conventional position servos which solve the well-known equation:

$$M = \frac{V_p}{a}$$

where M equals Mach number, $V_p$ equals true airspeed, and $a$ equals the speed of sound at aircraft altitude. Inasmuch as grounded flight trainers have utilized means having airspeed and altitude available as electromechanical servo output shaft positions for many years, it has been very common to solve the above equation by applying a potential proportional to airspeed to a conventional position servo and modifying the re-balancing potential of the servo in accordance with $a$, the function of altitude. Such systems have been deemed acceptable in most trainers of the prior art, but the invention provides alternative arrangements having considerable advantages.

As is well-known to those skilled in the art, the generation of computing potentials by means of electromechanical multiplication (servo-driven potentiometers) provides computing potentials which have inherent errors and "noise" due to the friction, backlash, hysteresis and inertia of all presently available computing servo-mechanisms. The more multiplications made in the generation of a potential commensurate with a simulated flight quantity, the greater is the error and "jitter" of such a potential. Some of the deleterious effects of "noise" or electromechanical signal anomalies in flight simulators are described in the copending application Serial Number 600,479 filed July 27, 1956, now Patent No. 2,935,796 by John M. Hunt entitled "Improved Grounded Trainer," and assigned to the same assignee as the present invention.

It will be seen that upon addition of the prior art Mach number servo to the trainer, each of the aerodynamic forces and moments potentials which require modification by Mach number were made to suffer from the further amount of electro-mechanical noise and jitter caused by three further electro-mechanical multiplications. These three were (1) the anomalies inherent in generation of the $V_p$ input to the Mach number servo; (2) the anomalies inherent in modification of the Mach number re-balancing potential in accordance with the speed of sound by the conventional simulated altitude servo, and (3) the anomalies inherent in the potentiometer driven by the Mach number servo to modify the particular aerodynamic force or moment potential. It will be seen as the description proceeds that the invention provides means for providing such potentials with few anomalies, through the use of less electromechanical multiplications.

Inasmuch as ground track recorders and much other apparatus of prior art trainers traditionally have utilized true airspeed ($V_p$) potentials for computing various flight quantities, it may be seen that many persons skilled in the trainer art have assumed that it was necessary to provide a true airspeed servo in every complete grounded trainer. The present invention allows more accurate flight simulation, and at the same time provides a saving in cost due to elimination of the airspeed servo heretofore utilized in trainers of the prior art.

It is therefore a primary object of the present invention to provide improved grounded flight trainer apparatus for the accurate, relatively noise-free, and economical simulation of Mach number.

It is another object of the present invention to provide improved grounded flight trainer apparatus which utilizes accurate and economical modifications of simulated aerodynamic forces and moments potentials in accordance with the Mach number of simulated flight.

It is a further object of the present invention to provide improved grounded flight trainer apparatus which utilizes accurate and economical apparatus for variation of other flight performance variables in accordance with simulated Mach number.

It is an additional object of the present invention to provide improved grounded flight trainer apparatus which utilizes improved apparatus for the accurate and economical simulation of simulated coefficient of lift in accordance with the instantaneous Mach number of simulated flight.

It is another object of the present invention to provide improved grounded flight trainer apparatus which accurately and economically provides simulation of the coefficient of induced drag in accordance with simulated Mach number.

It is another object of the present invention to provide improved grounded flight trainer apparatus for the accurate and economical simulation of true airspeed under simulated flight conditions of variable Mach number.

It is still another object of the present invention to provide improved grounded flight trainer apparatus for the accurate and economical simulation of dynamic pressure during simulated flight conditions of variable Mach number.

It is a further object of the present invention to provide improved grounded flight trainer apparatus for the accurate and economical simulation of the rate of change of aircraft altitude in accordance with Mach number.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 1:
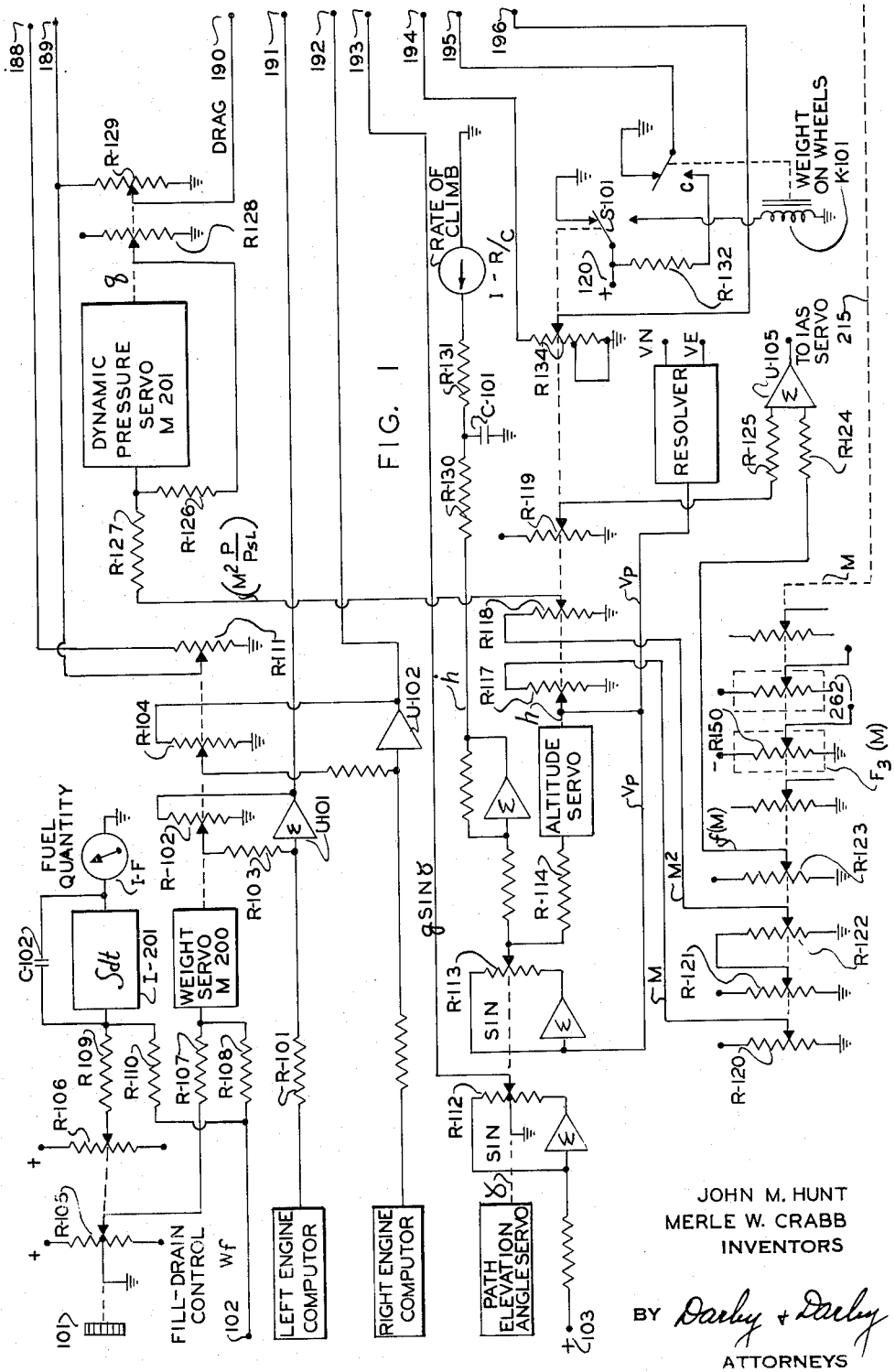
FIGS. 1 and 2 are electrical schematic diagrams partially in block form, which taken together, illustrate an exemplary embodiment of the invention.

As already suggested prior art grounded trainers for the simulation of flight utilized Mach number as a means of modifying aerodynamic forces and moments in a manner which was both inaccurate, due to anomalies in electro-mechanical components, and uneconomical. In the prior art, the longitudinal acceleration potential of the simulated aircraft usually has been integrated by electromechanical means to obtain a shaft position representative of simulated true airspeed. One of the primary functions of the prior art true airspeed shaft usually has been to provide an input quantity to a means which generates simulated Mach number by modifying simulated true airspeed by a function of simulated altitude. In order that a simulated Mach number quantity shall perform its many required functions in a conventional contemporary flight simulator, it must also be provided as a shaft position, since many flight quantities which are functions of Mach number exist only as voltages in contemporary simulators, and mechanical shaft position quantities are required to modify such voltages due to the limitations of contemporary means for multiplying two or more voltages. Thus both true airspeed and Mach number appear as shaft positions in the prior art. As already suggested, this results in two undesirable situations. First, costly electro-mechanical servo means are needlessly used for the derivation of true airspeed $V_p$; and secondly, the electromechanical derivation of simulated true airspeed ($V_p$) for application as an input to the electromechanical means used for the derivation of Mach number (M) results in this latter quantity being unnecessarily in error owing to the electromechanical anomalies created by the true airspeed servo. These inherent anomalies have been discussed above. The present invention avoids the need for the calculation of true airspeed $V_p$ as an input for simulated Mach number. Moreover, the present invention avoids altogether the need for calculation of simulated true airspeed by electro-mechanical means.

By definition $$M = \frac{V_p}{a} \text{ or } V_p = Ma$$

where M equals Mach number, $V_p$ equals true airspeed, and $a$ equals the speed of sound at the altitude of the aircraft. Under standard atmospheric conditions, wherein the speed of sound $a$ is a function of altitude, one may substitute $$\frac{f(h)}{V}$$

for $a$, to derive the following expressions, with $$M = \frac{V_p}{f(h)}$$

being commonly mechanized in prior art trainers.

$$M = \frac{V_p}{f(h)} \text{ or } V_p = Mf(h)$$

Differentiating this expression with respect to time, $$\dot{V}_p = \dot{M}f(h) + \dot{f}(h)M$$

Since $\dot{V}_p$, the rate of change of airspeed, is the same as $a_x$, the acceleration along the longitudinal axis of the flight path, $$a_x = \dot{M}f(h) + \dot{f}(h)M$$

$$\dot{M} = \left[a_x - \dot{f}(h)M\right]\frac{1}{f(h)}$$

or $$\dot{M} = \left[a_x - \dot{f}(h)M\right]f_1(h)$$

It should be apparent that these two expressions for the rate of change of Mach number M are the same except that the function of altitude $$\frac{1}{f(h)}$$

is the reciprocal of the function of altitude $f_1(h)$. By mechanizing these two equations as shown in two of the illustrated alternative embodiments, the present invention obtains $\dot{M}$ (simulated rate of change of Mach number) and avoids the determination of true airspeed as a necessary prerequisite to computation of simulated Mach number. A shaft position commensurate with Mach number may be obtained by integrating a quantity commensurate with the rate of change of Mach number, or $\dot{M}$, by a conventional electro-mechanical velocity servo. However, as will be made clear below, an electronic integrator may be used to obtain a potential commensurate with the rate of change of Mach number, or $\dot{M}$, and then a conventional electro-mechanical position servo may be used to obtain a shaft position commensurate with Mach number. This method saves a costly velocity generator. It will be apparent that $$\overline{f(h)}$$

which is in fact $$\frac{da}{dt}$$

may be expressed as $$\frac{da}{dh} \times \frac{dh}{dt}$$

by assuming that the speed of sound is a function of altitude only as for standard atmosphere conditions, whereupon $$\overline{f(h)}$$

becomes $f'(h)\dot{h}$, in which $f'(h)$ is the first derivative of $a$ with respect to $h$. $\dot{M}$ then becomes equal to $$[a_x - f(\dot{h})M]f_1\dot{h}$$

The embodiment described below relative to FIGS. 1 and 2 operates in accordance with the following equation:

$$\dot{M} = a_x f_1(h)$$

At about 35,000 ft. of altitude, the temperature change of the standard atmosphere with altitude is very gradual, so that the quantity $f(h)$, normally a small quantity, may be considered to be zero with small error. In less rigorous flight simulators this term sometimes is neglected. The alternative embodiment of the invention shown below in FIG. 4 operates in accordance with the rigorous equation:

$$\dot{M} = [a_x - f(\dot{h})M]\frac{1}{f(h)}$$

set forth above. Still another embodiment shown below in FIG. 7 operates in accordance with the less rigorous equation:

$$\dot{M} = \frac{a_x}{f(h)}$$

Figure 2:
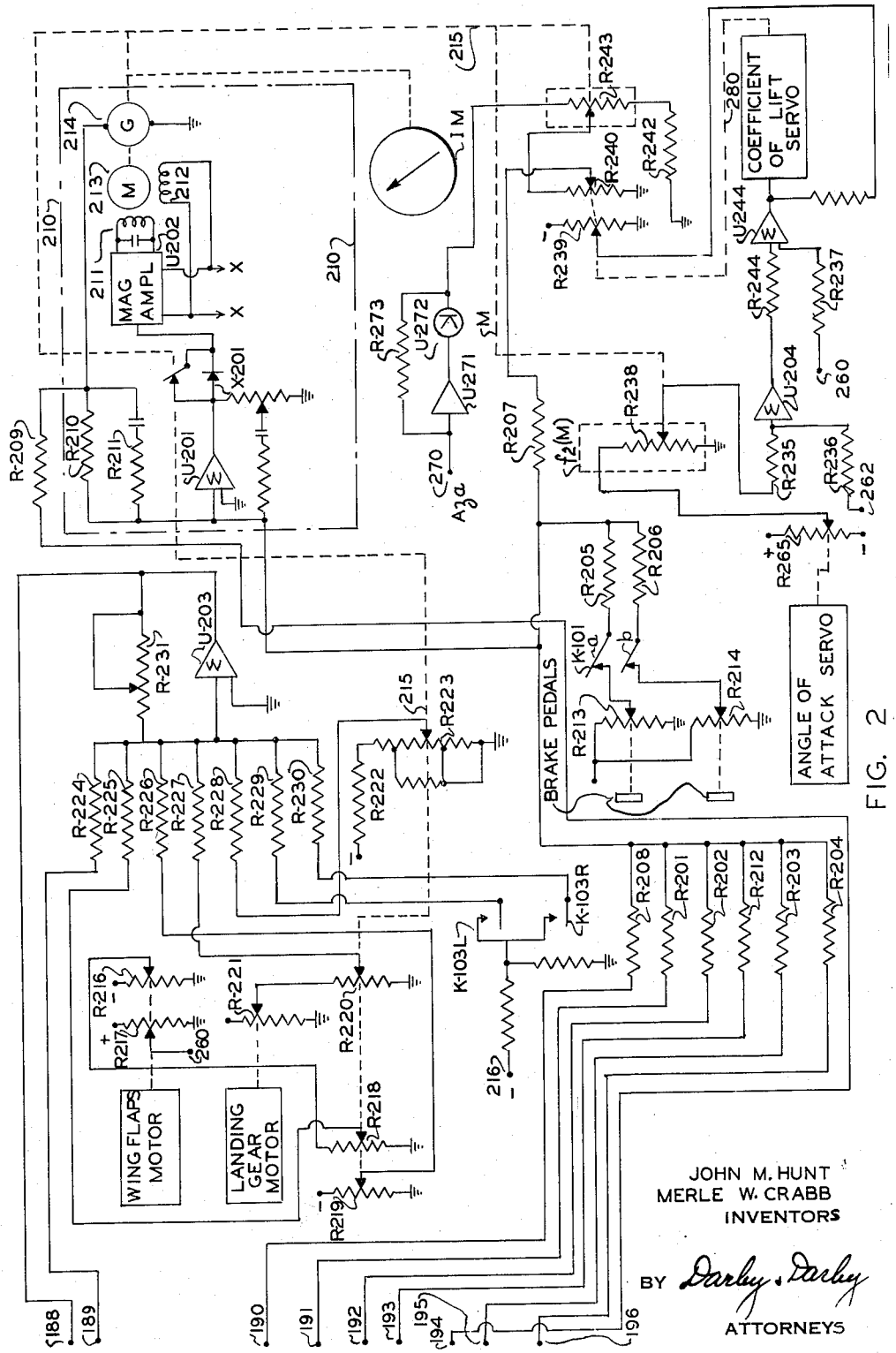

Referring to FIG. 2, the Mach number servo of an exemplary embodiment of the invention is shown within dashed lines at 210. An input operational amplifier U–201 of conventional construction receives a plurality of input voltages, each of which will be described below, and provides an output signal via rectifier X–201 to a magnetic amplifier shown in block form at U–202. The amplified output signal from amplifier U–202 excites the control winding 211 of a conventional two-phase servomotor. Excitation of quadrature winding 212 of the motor is provided from a conventional alternating current power supply connected at terminals X, X. The computing signals utilized with the disclosed specific embodiment of the invention are direct voltages. Direct current signals are applied to the control coil (not shown) of magnetic amplifier from amplifier U–201, but the reactance windings (not shown) of amplifier U–202 are connected to the alternating voltage source at X, X, so that alternating signals suitable for driving the two-phase motor are provided. The rotor 213 of the motor drives a direct current tachometer generator 214, and the arms of numerous potentiometers are positioned in accordance with simulated Mach number by shaft 215, which shaft is driven by rotor 213 through conventional reduction gearing (not shown). A simulated machmeter I—M may be positioned by shaft 215 if the aircraft being simulated is provided with such an instrument. In most embodiments of the invention, a synchro connection (not shown) would be utilized to drive the simulated machmeter pointer from the Mach number servo.

The input potentials applied to amplifier U–201 to cause shaft 215 to be positioned in accordance with simulated Mach number will now be described. Potentials commensurate with simulated engine thrust may be derived in conventional manner by conventional "Left" and "Right" engine computers shown in FIG. 1 in block form. The thrust potential from the "Left" Engine Computer" is applied via summing resistor R–101 to the input circuit of operational amplifier U–101. The output potential from amplifier U–101 is applied to excite potentiometer R–102, the arm of which is positioned by a conventional trainer "Weight" servo shown in block form. The voltage on the arm of potentiometer R–102 is applied to the input circuit of amplifier U–101 via resistor R–103. Those skilled in the art will recognize that the connections shown serve to provide an output potential from amplifier U–101 commensurate in magnitude with the ratio between simulated left engine thrust and simulated aircraft weight, and it will be recognized that such ratio is a measure of simulated aircraft acceleration due to thrust of the left engine. The output potential from amplifier U–101 is applied via terminal 191 and summing resistor R–201 (see FIG. 2) to the input circuit of amplifier U–201. The right engine thrust potential is similarly divided by simulated weight by means of amplifier U–102 and potentiometer R–104, and the output potential commensurate with simulated aircraft acceleration due to right engine thrust is applied from amplifier U–102 via terminal 192 and summing resistor R–202 to amplifier U–201. Inasmuch as aircraft engines are usually mounted in fixed relation to the aircraft longitudinal axis, the thrust and acceleration quantities mentioned above are usually specified with relation to the aircraft longitudinal axis. When the aircraft flies with an appreciable angle of attack or sideslip angle, the aircraft accelerations computed as described above are correct if referred to aircraft axes but incorrect for flight path axes. Since Mach number refers to travel along the flight path, it is sometimes desirable in the interests of accuracy to modify the above described acceleration potentials in accordance with the cosine of the simulated angle of attack and the cosine of the simulated sideslip angle before applying the potentials to summing amplifier U–201. As will be apparent to those skilled in the art, the two acceleration potentials may be modified readily by the use of cosine resolvers positioned by conventional grounded trainer angle of attack and sideslip angle servos.

The weight servo M–200 shown in block form in FIG. 1 may comprise a conventional integrating or "velocity" servo. Control knob 101 is provided to enable an instructor to adjust the arms of potentiometers R–105 and R–106. The winding of potentiometer R–105 is excited at its ends with constant voltages of opposite polarity from a conventional power supply, and adjustment of R–105 by "Fill-Drain" control knob 101 applies a potential of selected polarity to the input circuit of weight servo M–200. Potentiometer R–106 applies a similar potential to the input circuit of electronic integrator I–201 via summing resistor R–109. A potential commensurate with simulated rate of fuel flow derived in conventional manner by a conventional trainer engine computer is applied at terminal 102, via resistor R–110 to integrator I–201 and via resistor R–108 to the input circuit of weight servo M–200. Prior to the commencement of a training flight the instructor may turn control knob 101 so as to provide potentials to integrator I–201 and servo M–200 representative of the filling of the fuel tanks. During simulated flight the fuel flow rate $\dot{W}_f$ potential at terminal 102 will cause weight servo M–200 to rotate back toward a minimum weight position. The output potential from integrator I–201 represents the time integral of the fuel flow rate and filling or draining rate potentials applied to the integrator, and this output potential may be utilized to operate a simulated fuel quantity meter I–F shown in FIG. 1 as comprising a meter movement instrument. The sum of the input potentials applied to weight servo M–200 via resistor R–107 and R–108 represents the rate at which the aircraft weight is changing due to change in fuel weight as either fuel consumption or refueling takes place. A tachometer generator (not shown) driven by servo M-200 opposes the summed input potentials, causing the weight servo to integrate the rate of change of weight potential to provide a shaft output proportional to simulated aircraft weight.

A fixed potential at terminal 103 from the computer power supply is applied in opposite polarities to excite sine resolver R-112, the arm of which is positioned by the conventional trainer path elevation angle servo shown in block form. The potential commensurate with $\sin \gamma$ on the arm of potentiometer R-112 is applied via terminal 193 and resistor R-212 (see FIG. 2) to the input circuit of amplifier U-201. The potential is scaled by resistor R-212 so as to make this input to amplifier U-201 commensurate with $g \sin \gamma$, where $g$, the acceleration of gravity, is a constant. It will be seen that the acceleration of the aircraft along the flight path due to the force of gravity is represented by the potential applied via resistor R-212.

Referring now to FIG. 2, a constant potential from the computer supply is applied to excite the windings of potentiometers R-213 and R-214, the arms of which are positioned by operation of the trainer left and right brake pedals, respectively. Since operation of the brake pedals can affect aircraft Mach number only when the simulated aircraft is "on the ground," the braking force potentials from potentiometers R-213 and R-214 are routed through contacts $a$ and $b$ of "Weight on Wheels" relay K-101, and thence via summing resistors R-205 and R-206 to the input circuit of amplifier U-201. As shown in FIG. 1, the coil of "Weight on Wheels" relay K-101 is energized by closure of switch S-101. Switch S-101 may be operated by a cam on the shaft of the conventional trainer altitude servo to close whenever simulated altitude becomes zero. Energization of relay K-101 upon occurrence of a simulated landing closes its contact $c$, applying a fixed potential commensurate with simulated rolling friction of the aircraft via terminal 195 and resistor R-203 to amplifier U-201.

A further potential commensurate with certain simulated aircraft accelerations is applied to the input circuit of amplifier U-201 via resistor R-208. A conventional trainer flaps motor positions the arms of potentiometers R-216 and R-217, as shown in FIG. 2. The negative potential on the arm of potentiometer R-216 is applied to excite potentiometer R-218, the arm of which is positioned by the Mach number servo shaft 215, thereby providing a potential commensurate with wing flaps deflection modified in accordance with Mach number for application to amplifier U-203 via resistor R-225. Similarly, a conventional trainer landing gear motor positions the arm of potentiometer R-221, deriving a landing gear deflection potential which is modified in accordance with a function of Mach number by potentiometer R-220 and applied via resistor R-227 to amplifier U-203. A fixed potential from the power supply is routed from terminal 216 to contacts of "Left Engine Fired" relay K-103L and "Right Engine Fired" relay K-103R. Conventional trainer "engine fired" relays which need not be shown herein operate to disconnect terminal 216 from amplifier U-203 whenever the simulated engines are firing. Whenever one or both of the simulated engines is not firing, the potential or potentials applied to amplifier U-203 via resistor R-229 and/or resistor R-230 serve to simulate the increase in drag coefficient due to engine windmilling.

The potentials which have been described above as having been applied to amplifier U-203 are each commensurate with components of aerodynamic drag coefficient. The gain of amplifier U-203 and the scaling of resistors may be selected in accordance with the wing area constant S of the aircraft being simulated. The drag coefficient output potential from summing amplifier U-203 is routed via terminal 188 to excite potentiometers R-129 and R-111. The arm of potentiometer R-129 is positioned in accordance with simulated dynamic pressure $q$ by means of dynamic pressure servo M-201 shown in block form in FIG. 1. Since according to the well known relation:

$$\text{Drag } D = qSC_D$$

it will be seen that the potential applied from potentiometer R-129 (via terminal 190) to amplifier U-201 (via resistor R-208) might be proportional to aerodynamic drag force. However, the modification of the amplifier U-203 output potential by potentiometer R-111, and the connection of the arm of potentiometer R-111 (via terminal 189 and resistor R-224) back to the input circuit of amplifier U-203 serve to divide the output potential by simulated mass, thereby making the potential applied to amplifier U-201 via resistor R-208 commensurate with simulated deceleration due to aerodynamic drag.

As is known in the aerodynamic arts, the coefficient of lift of an aircraft is a complex quantity which may be made up of the following components when considered in a moderately rigorous form:

$$C_{L_{\alpha_0}}$$

which represents the coefficient of lift component when the angle of attack of the aircraft is zero; $\alpha C_{L_\alpha}$ which represents the coefficient of lift component resulting from an angle of attack $\alpha$; and $C_{L_{\delta_{fw}}}$ which represents the coefficient of lift coefficient resulting from the extension of the wing flaps of the aircraft. Complexity results from the fact that two of these components vary as separate and distinct functions of Mach number. The total coefficient of lift $C_L$ might be characterized mathematically as $$C_L = \alpha C_{L_\alpha} + C_{L_{\alpha_0}} + C_{L_{\delta_{fw}}}$$

where $$C_{L_\alpha} = f_2(M)$$

and $$C_{L_{\alpha_0}} = f_3(M)$$

These two functions $F_1$ and $F_2$ of Mach number are different for each aircraft being simulated and normally are available from estimated or test data for a particular aircraft being simulated. Although $C_{L_{\delta_{fw}}}$ is actually a function of Mach number, wing flaps are rarely operated at speed ranges in which the coefficient varies appreciably. For this reason, it is usually considered unnecessary to modify the $C_{L_{\delta_{fw}}}$ potential in accordance with Mach number. In FIGS. 1 and 2 potentiometers R-238 and R-150 may be shaped in a conventional manner to provide $f_2(M)$ and $f_3(M)$ potentials, respectively, when the movable tap of each is positioned in accordance with simulated Mach number by shaft 215. A conventional trainer angle of attack servo shown in block form in FIG. 2 positions the arm of potentiometer R-265, applying a potential commensurate with simulated angle of attack to energize functional potentiometer R-238. As already explained, potentiometer R-238 is shaped in accordance with the functional relationship $f_2(M)$. Therefore, when R-238 is energized in accordance with the angle of attack $\alpha$, its wiper will provide a potential commensurate with the product $\alpha C_{L_\alpha}$ as it varies with Mach number. This potential may then be applied to summing amplifier U-204 via summing resistor R-235. In FIG. 1 the winding of potentiometer R-150 is excited by a constant negative potential from the computer power supply, deriving a $f_3(M)$ potential which is applied to summing amplifier U-204 (FIG. 2) via terminal 262 and summing resistor R-236. The scaling of R-236 makes this input potential to amplifier U-204 commensurate with $$f_3(M)_{\alpha_0} \text{ or } C_{L_{\alpha_0}}$$

Figure 3A:
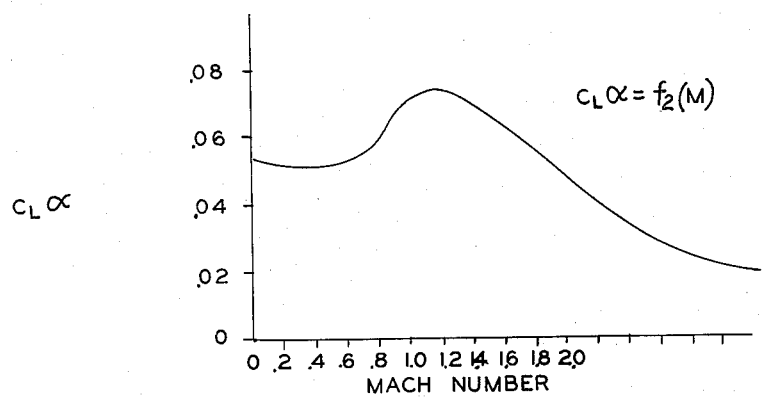
FIGS. 3a and 3b are graphs illustrating typical functions of Mach number which may be useful to consider in understanding the invention.
Figure 3B:
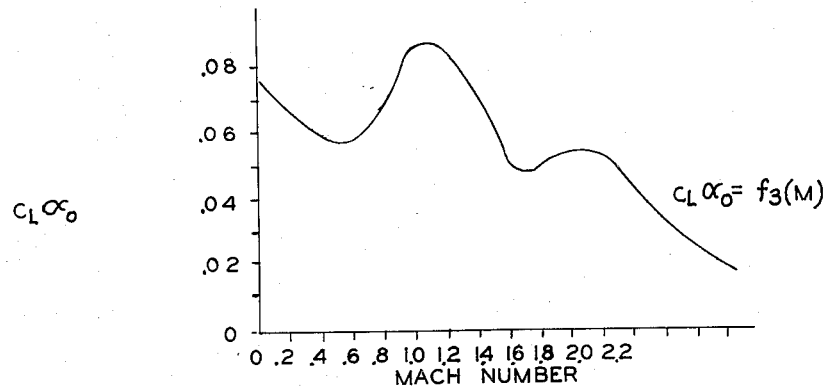

These two potentials commensurate with $$\alpha C_{L_\alpha} \text{ and } C_{L_{\alpha_0}}$$

are summed in amplifier U-204. The output potential from amplifier U-204 is applied through resistor R-244 to the input terminal of summing amplifier U-244. Potentiometer R-217, operated by the trainer wing flaps motor as described above, provides a potential commensurate with wing flaps deflection at terminal 260. This potential is applied to summing amplifier U-244 through summing resistor R-237. The output potential from summing amplifier U-244 is commensurate with the total coefficient of lift of the simulated aircraft and may be used to position a shaft 280 in accordance with its magnitude by use of a conventional position servo shown in block form and labelled Coefficient of Lift servo. FIGS. 3A and 3B are plots of the voltage versus wiper arm position characteristics of potentiometers R-238 and R-150 to simulate $$C_{L_\alpha} \text{ and } C_{L_{\alpha_0}}$$

for a typical high speed, high performance aircraft. Some aircraft utilize further means, such as speed brakes, for example, which also affect coefficient of lift. Simulation of such further means may be provided in a manner similar to that set forth above.

Further, a potential commensurate with the deceleration due to induced drag may be derived and applied to amplifier U-201 via resistor R-207. Induced drag is that drag resulting from the air foils which produce the lift of the aircraft, and the deceleration resulting from the drag can be expressed as $$a_{x_{C_{di}}} = \frac{qSC_L^2 C_{di}}{m}$$

where $a_{x_{C_{di}}}$ = the deceleration resulting from induced drag, $q$ = dynamic pressure, $S$ = surface area of the air foils creating lift of the particular simulated aircraft, $C_L$ = total coefficient of lift of the particular simulated aircraft, $C_{di}$ = total coefficient of induced drag of the particular simulated aircraft, $m$ = mass of the particular simulated aircraft.

Since $$a_{za} = \frac{qSC_L}{m}$$

where $a_{za}$ equals the vertical aerodynamic acceleration of the simulated aircraft, and the other terms are defined as above, the deceleration resulting from induced drag may be represented as $$a_{x_{C_{di}}} = a_{za} C_L C_{di}$$

A potential commensurate with the quantity $a_{za}$ is a standard flight computer quantity and may be generated in a conventional manner, as exemplified in a copending application Serial Number 477,741, now Patent No. 2,925,667, of Laurence E. Fogarty entitled "Aircraft Trainer Apparatus," and assigned to the same assignee as the present invention. In order to solve this equation for $$a_{x_{C_{di}}}$$

the $a_{za}$ potential may be applied to terminal 270 to energize functional potentiometer R-243 through an isolation amplifier U-271 and diode U-272. The purpose of the diode is to prevent the reversal of the sign of the $a_{za}$ potential during dives from causing the deceleration potential due to simulated induced drag from appearing as an acceleration potential. Feedback resistor R-273 may be used to provide scaling. If the magnitude of the potential energizing potentiometer R-243 is commensurate with the product of $a_{za}$ and the maximum coefficient of induced drag $C_{di}$, the variation of $C_{di}$ as a function of Mach number may be simulated by shaping potentiometer R-243 in a conventional manner in accordance with this function and by positioning its movable wiper by shaft 215 in accordance with the magnitude of simulated Mach number. As a result, the potential appearing on the wiper of potentiometer R-243 is commensurate with the instantaneous value of the product $a_{za} C_{di}$. This potential may be used to energize potentiometer R-240 so that a potential commensurate with $a_{za} C_{di} C_L$ will appear on its movable wiper when that wiper is positioned by shaft 280 in accordance with the simulated coefficient of lift of the simulated aircraft. Since this potential corresponds to the right-hand side of the above equation for $$a_{x_{C_{di}}}$$

it may be considered to be commensurate with the deceleration of the simulated aircraft resulting from induced drag. It is applied to amplifier U-201 via resistor R-207. It should be noted that the functional relationship between the coefficient of induced drag and Mach number is a characteristic of the particular aircraft being simulated.

It will be seen from the description above that the potentials which have been derived and applied to amplifier U-201 are each commensurate with a simulated acceleration of the simulated aircraft along the longitudinal axis of its flight path, decelerations being recognized as negative accelerations. The collective effect of the individual longitudinal accelerations may be designated $a_x$. The steady-state input potentials to the servo may be seen to include the collective acceleration quantity $a_x$, a rate of change of Mach number potential $k_1 \dot{M}$ derived by tachometer generator 214 and applied through resistor R-210, and a $k_2 f(h) \dot{M}$ potential derived by applying the output potential from generator 214 via resistor R-209 and terminal 194 to excite shaped potentiometer R-134 (FIG. 1). A conventional lead circuit including resistor R-211 is provided to improve servo response. The arm of potentiometer R-134 is positioned by the trainer altitude servo, and the potential derived on the arm is applied via terminal 196 and resistor R-204 to the input circuit of amplifier U-201.

The output shaft 215 of the Mach number servo drives a number of further potentiometers, only a few of which are shown in the drawings. Potentiometer R-120, the winding of which is excited by a constant voltage from the power supply, applies a potential commensurate with simulated Mach number to excite potentiometer R-117, the arm of which is positioned by the trainer altitude servo. Potentiometer R-117 is shown as a simple potentiometer but in actual practice may comprise a shaped potentiometer having a voltage versus shaft rotation characteristic corresponding to the variation in the speed of sound with altitude. The resulting modification of the M potential by the speed of sound at the simulated altitude provides an output potential commensurate with simulated airspeed. The simulated airspeed or $V_p$ potential may be resolved through the simulated flight path direction angles in conventional manner by resolvers shown collectively in block form. The resolved output potentials will be commensurate with "northerly" and "easterly" ground track velocities (assuming no simulated wind velocities are added), and such track velocity potentials may be utilized in conventional manner to operate ground track recorders and other usual trainer apparatus.

The airspeed potential from potentiometer R-117 also is applied to excite sine resolver R-113, the arm of which is positioned in accordance with simulated path elevation angle, thereby deriving a $V_p \sin \gamma$ or $\dot{h}$ potential commensurate with the vertical component of airspeed, or rate of change of altitude. The $\dot{h}$ potential from resolver R–113 is applied via scaling resistor R–114 to the input of a conventional grounded trainer velocity or integrating servo shown in block form. A tachometer generator (not shown) driven by the altitude servo motor (not shown) applies a velocity feedback potential to the input circuit of the altitude servo, forcing the servo to rotate at a speed commensurate with the magnitude of the $\dot{h}$ potential applied via resistor R–114, and thereby providing an output shaft position commensurate with simulated altitude. The $\dot{h}$ potential is also applied via resistor R–115 through a buffer circuit and a lag circuit consisting of resistors R–130 and R–131 and capacitor C–101 to operate a simulated rate of climb meter I–R/C shown as comprising a simple meter movement. The lag circuit provides a time delay in operation of the meter to simulate the delay inherent in the pressure-operated rate of climb instruments of actual aircraft.

Potentiometer R–123 is excited by constant potentials, and its arm is positioned by the Mach number servo so as to provide a potential commensurate with a non-linear function of Mach number for application to summing amplifier U–105, via resistor R–124. Potentiometer R–119, the winding of which also is excited by a constant potential, derives a potential commensurate with a non-linear function of altitude, and this potential is applied to summing amplifier U–105 via resistor R–125. The output potential from amplifier U–105 is applied to position a simulated airspeed indicating instrument in the manner shown in application Serial Number 604,265 now Patent No. 2,938,280 filed by John M. Hunt for "Simulated Aircraft Speed Indicating Systems."

Dynamic pressure $q$ is a very important aerodynamic quantity (which has dimensions of pounds per square foot, for example) and is extremely useful in flight simulators for the calculation of simulated lift and the determination of the effect on flight of the various control surfaces. As is well known in the prior art, $$q = \tfrac{1}{2} \rho V_p^2$$

where $\rho$ = the standard air density at the altitude of simulated flight and
$V_p$ = true airspeed.

Since $$\rho = \frac{Kp}{a^2}$$

where $K$ = a constant
$p$ = air pressure at the simulated altitude of the flight simulator and
$a$ = the speed of sound at the simulated altitude of the flight simulator $$q = \frac{\tfrac{1}{2} K p}{a^2} V_p^2$$

Further, since $$M = \frac{V_p}{a}$$

as set forth above, then $$q = K_1 p M^2$$

where $M$ = Mach number
$K_1$ = a constant, and
$p$ = a function of altitude, $f(h)$ Thus, in FIG. 1 potentiometer R–121 is excited by a constant potential, its arm is positioned by the Mach number shaft 215, and the M potential on the arm of potentiometer R–121 is applied to excite the winding of potentiometer R–122, the arm of which also is positioned by shaft 215, thereby deriving a "Mach number squared" potential to excite altitude-actuated potentiometer R–118. The $f(h)M^2$ potential derived on the arm of potentiometer R–118 is applied via summing resistor R–127 to a conventional position servo M–201. Although shown in FIG. 1 as a simple potentiometer, R–118 is provided with a voltage versus shaft rotation characteristic corresponding to the change in pressure with altitude under standard atmospheric conditions in the manner shown in FIG. 5. Dynamic pressure servo M–201 is provided with a conventional rebalancing potentiometer R–128. The use of the dynamic pressure servo in computing simulated drag was explained above. Servo M–201 also positions further potentiometers (not shown) to aid in computing further simulated flight quantities, simulated lift being a notable example.

Figure 4:
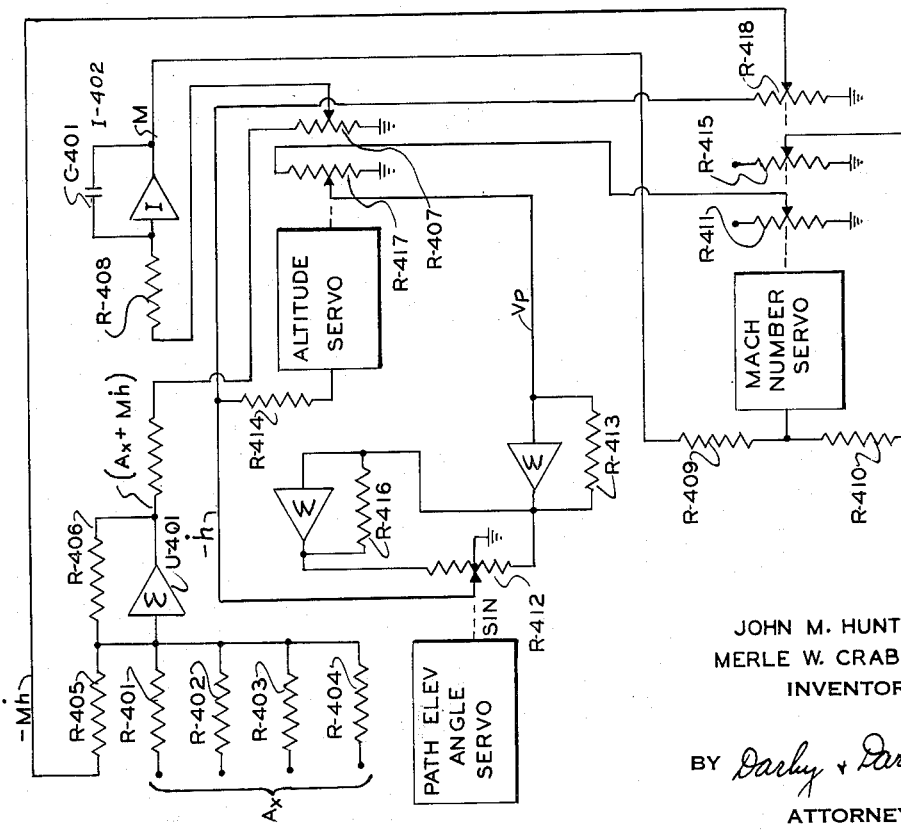
FIG. 4 is an electrical schematic diagram illustrating portions of a modified or alternate embodiment of the invention.

Shown in FIG. 4 in electrical schematic form are portions of an alternative embodiment of the invention which solves the equation $$(a_x - f\dot{h}M)\frac{1}{f(h)}$$

Potentials commensurate with longitudinal acceleration may be derived in the same manner as shown in FIGS. 1 and 2 (or in equivalent manner) and applied to summing amplifier U–401, as by means of summing resistors, R–401, R–402, R–403 and R–404 being shown as examples. A potential commensurate with the product of Mach number and rate of change of altitude is derived as explained below and applied to amplifier U–401 via summing resistor R–405. The output potential proportional to the quantity $(a_x - M\dot{h})$ from amplifier U–401 is applied to excite potentiometer R–407, the arm of which is positioned by the trainer altitude servo. Although shown as a simple linear potentiometer in FIG. 4, potentiometer R–407 has a voltage versus shaft rotation characteristic such as that shown in FIG. 5, and such a characteristic may be approximated quite closely by the circuit of FIG. 6. The specific potentiometer shown in FIG. 6 presumes that simulated flight shall be limited to altitudes below 80,000 feet. As will be clear from an examination of FIG. 6, a linear 10K potentiometer has connected together three taps located at portions of its winding corresponding to altitudes of 80,000 feet, 57,500 feet and 35,300 feet. Also, a 15.2K resistor is connected in parallel with the section of the potentiometer winding representing altitudes between zero and 18,000 feet.

The $$(a_x - M\dot{h})\frac{a}{a_{SL}}$$

quantity on the arm of potentiometer R–407 will be seen from the above equation to be commensurate with $\dot{M}$, the rate of change of simulated Mach number. This potential is applied through scaling resistor R–408 to a conventional electronic integrator I–402, such as the well-known Miller integrator, for example, which is shown simply as an operational amplifier having a capacitor C–401 in its feedback circuit. Integration of the $\dot{M}$ potential with respect to time provides, of course, an output potential commensurate with simulated Mach number. This Mach number potential is applied via summing resistor R–409 to operate a conventional position servo to provide a shaft output position commensurate with simulated Mach number. Potentiometer R–415 has its winding excited from the computer power supply and its arm positioned by the Mach number servo, and hence a rebalancing potential is applied to the input circuit of the servo via summing resistor R–410.

Figure 5:
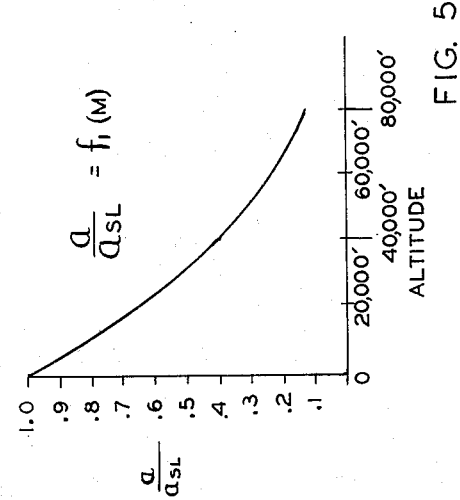
FIG. 5 is a graph illustrating a typical function of altitude useful in understanding the invention.
Figure 6:
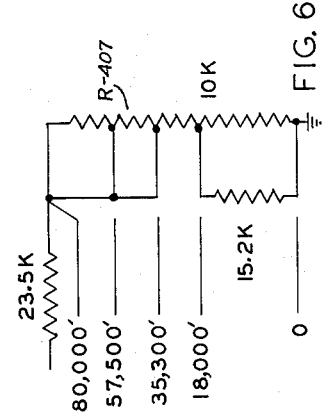
FIG. 6 is an electrical schematic of a functional potentiometer having a voltage versus mechanical position characteristic similar to the graph shown in FIG. 5.

Potentiometer R–411 positioned by the Mach number servo applies a potential commensurate with M to excite potentiometer R–417, the arm of which is positioned by the trainer altitude servo. Although shown as a simple linear potentiometer, potentiometer R–417 has a voltage output versus shaft rotation characteristic such as shown in FIG. 5 and a circuit such as shown in FIG. 6. The M voltage from potentiometer R–411 thusly is multiplied by $a$, the speed of sound at simulated instantaneous altitude, thereby providing an output potential commensurate with true airspeed, $V_p$. The $V_p$ potential may be resolved about the flight path direction angles to provide ground track velocities by conventional apparatus not shown. The true airspeed potential is also modified in accordance with simulated flight path elevation angle $\gamma$ by sine resolver R–412 to provide a rate of change of altitude potential designated as $\dot{h}$. The $\dot{h}$ potential is applied to the trainer altitude servo (a conventional velocity or integrating servo) to provide a shaft output position commensurate with simulated altitude. The rate of change of altitude potential is also applied to excite potentiometer R–418, the arm of which is positioned by the trainer Mach number servo, thereby deriving with M$\dot{h}$ potential described above as being applied to amplifier U–401 via resistor R–405. The further apparatus shown as operated by the Mach number and altitude servos of FIGS. 1 and 2 may, of course, be operated by the Mach number and altitude servos of FIG. 4, as well as other apparatus commonly actuated in trainers by such servos.

Figure 7:
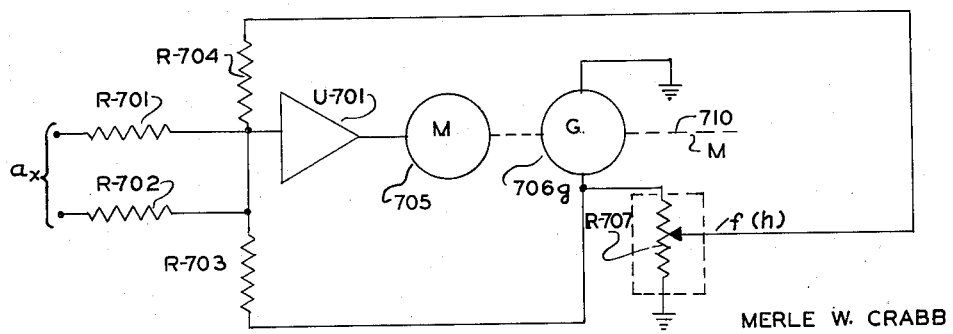
FIG. 7 is an electrical schematic diagram illustrating portions of a further modified or alternative embodiment of the present invention.

Shown in FIG. 7 is an electrical schematic of a further alternative and less rigorous embodiment of the present invention which solves the equation $$\dot{M} = \frac{a_x}{f(h)}$$

in order to provide a quantity commensurate with Mach number. A potential commensurate with the longitudinal acceleration of a simulated aircraft along its flight path may be derived in the same manner as shown in FIGS. 1 and 2 (or FIG. 4) and applied to summing amplifier U–701 by means of plural summing resistors such as resistors R–701 and R–702. In order to obtain M from $a_x$, this latter quantity should be divided by a function of altitude. To accomplish this in one manner, the output from amplifier U–701 might be used to energize a functional potentiometer with a wiper positioned in accordance with the altitude $h$, and then one may apply the potential appearing on the wiper as a feedback voltage into the input circuit of amplifier U–701. However, an equivalent technique is shown to illustrate the many alternatives possible within the spirit of the present invention. Recalling that it is desirable for simulated Mach number to be obtained as a shaft position, the output of amplifier U–701 may be applied to a conventional velocity or integrating servo comprising at least a servomotor 705 driving a tachometer generator 706. The velocity potential of generator 706 is applied to input of amplifier U–701 through summing resistor R–703 in a conventional manner. Except for a time delay partially due to the inertia of motor 705, the potential output from tachometer generator 706 is same as that appearing at the output of U–701. Therefore, and as shown in FIG. 7, the dividing functional potentiometer R–707 may be connected for energization at the terminal of generator 706 and the potential appearing at its wiper (positioned in accordance with altitude) may be applied to the input of summing amplifier through summing resistor R–704. In this manner the input to summing amplifier U–701 may be divided by a function of altitude $f(h)$, thereby solving the equation $$\dot{M} = \frac{a_x}{f(h)}$$

and the shaft 710 of the velocity servo will be positioned commensurately with Mach number M.

It should be recognized that in each of these embodiments that Mach number is derived as a shaft position by modifying the longitudinal acceleration $a_x$ of the simulated aircraft along its flight path by a function of altitude and integrating this modified quantity either by a conventional electro-mechanical velocity servo or by integrating this modified quantity electronically and then positioning a shaft by a conventional position servo. In the first embodiment the modification of $a_x$ is accomplished by multiplying by function of altitude, while in the second and third embodiments, the modification of $a_x$ is accomplished by summing a feedback potential commensurate with a function of altitude (connected as a conventional dividing circuit) with the potentials commensurate with $a_x$. Common to all three embodiments in accordance with the present invention is the technique of obtaining a shaft position commensurate with Mach number without first obtaining a shaft position commensurate with true airspeed, thereby avoiding the anomalies of an extra electro-mechanical servo. Since Mach number is obtained with fewer anomalies it follows that any of the simulated aerodynamic forces and moments, aerodynamic quantities and flight performance data obtained from Mach number will also contain fewer anomalies. In addition it should be noted that electromechanical servos are comparatively expensive, and it is economically prudent to avoid their use when feasible.

Many deviations from the above disclosure may be made without departing from the present invention. For example, while direct current computation has been used in the above disclosed embodiments, it is obvious that the invention can be presented using A.C. computation techniques with components adapted for that purpose. While the summing devices shown herein are parallel adding amplifiers, differential synchros, mechanical differentials, and a variety of equivalent summing devices well known to those skilled in the art may be readily substituted without departing from the invention. Although functional potentiometers are shown in this disclosure as comprising linearly-actuated arms cooperating with either functional or sinusoidal windings, these potentiometers may utilize linear windings and trigonometric or non-linear functional mechanical actuating means for the arms, such as the scotch yoke, for example, for sine and cosine functions. Potentiometer functions may be provided as desired by all of the well known conventional techniques, including for examples, the use of padding resistors and the use of varying resistance card widths.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. Mach number computer means for grounded trainer apparatus comprising means for deriving a first potential commensurate with the acceleration of the simulated aircraft along its flight path, means for providing a second potential commensurate with a function of altitude, means for summing said first and second potentials, electromechanical integrating means responsive to the sum of said first and second potentials for deriving a quantity commensurate with Mach number including means for deriving a third potential commensurate with the rate of change of Mach number, means for deriving a quantity commensurate with altitude, and means responsive to both said third potential and said quantity commensurate with altitude for deriving said second potential.

2. Mach number computer means for grounded trainer apparatus simulating an aircraft comprising means for deriving a first potential commensurate with the acceleration of the simulated aircraft along its flight path, means for providing a second potential commensurate with a function of altitude, means for deriving a third potential commensurate with the rate of change of altitude, a shaft the position of which represents the instantaneous value of simulated Mach number of the simulated aircraft, means for deriving a fourth potential commensurate with the product of said third potential and said shaft position representing Mach number, means for summing said first, second and fourth potentials, electro-mechanical integrating means responsive to said summing means for deriving a quantity commensurate with Mach number including means for deriving a fifth potential commensurate with the rate of change of Mach number, means responsive to said third potential for deriving a quantity commensurate with the altitude of the simulated aircraft, and means responsive to both said fifth potential and said quantity commensurate with altitude for deriving said second potential.

3. Mach number computer means for grounded trainer apparatus simulating an aircraft comprising means for deriving a first potential commensurate with the acceleration of said simulated aircraft along its flight path, means for deriving a second potential commensurate with the rate of change of altitude of said simulated aircraft, a shaft the position of which represents the Mach number of said simulated aircraft, means for deriving a third potential commensurate with the product of said second potential and said shaft position commensurate with Mach number, means for summing said first and third potentials, means for deriving a fourth potential commensurate with the rate of change of Mach number by multiplying said first potential by a function of altitude of said simulated aircraft commensurate with the speed of sound as it varies with altitude, and velocity servo mechanism means for integrating said fourth potential and for providing said shaft position commensurate with Mach number.

4. Grounded training apparatus comprising in combination a simulated Mach number position servo and a simulated altitude integrating servo operable to provide shaft positions commensurate with Mach number and altitude respectively of a simulated aircraft, means for deriving potentials commensurate with accelerations of said simulated aircraft along a simulated flight path, first and second potentiometers operable by said Mach number servo and said altitude servo respectively to provide a simulated airspeed potential, means for modifying a reference potential in accordance with the simulated elevation angle of said simulated flight path to provide a third potential commensurate with simulated rate of change of altitude, said third potential being applied to said integrating servo, a third potentiometer actuated by said altitude servo and operable to modify said acceleration potentials to provide a simulated rate of change of Mach number potential, and an electronic integrator operable to integrate the last-named potential to provide a further potential, said position servo being responsive to said further potential.

References Cited in the file of this patent

UNITED STATES PATENTS

| | | |
|---|---|---|
| 2,560,528 | Dehmel | July 10, 1951 |
| 2,636,285 | Fogarty et al. | Apr. 28, 1953 |
| 2,731,737 | Stern | Jan. 24, 1956 |
| 2,775,124 | Gardner et al. | Dec. 25, 1956 |
| 2,784,501 | Stern et al. | Mar. 12, 1957 |
| 2,858,623 | Stern et al. | Nov. 4, 1958 |
| 2,882,615 | Dawson | Apr. 21, 1959 |

OTHER REFERENCES

Wood: The Modern Flight Simulator, Electrical Engineering, December 1952, pages 1124 to 1129.